US008468469B1

(12) United States Patent
Mendis et al.

(10) Patent No.: US 8,468,469 B1
(45) Date of Patent: Jun. 18, 2013

(54) ZOOMING USER INTERFACE INTERACTIONS

(75) Inventors: Indika C. Mendis, Mountain View, CA (US); Asif Zahir, San Francisco, CA (US)

(73) Assignee: Google Inc., Mountain View, CA (US)

( * ) Notice: Subject to any disclaimer, the term of this patent is extended or adjusted under 35 U.S.C. 154(b) by 523 days.

(21) Appl. No.: 12/423,084

(22) Filed: Apr. 14, 2009

Related U.S. Application Data

(60) Provisional application No. 61/045,200, filed on Apr. 15, 2008.

(51) Int. Cl.
G06F 3/048 (2006.01)
G06F 3/041 (2006.01)

(52) U.S. Cl.
USPC .......................................... 715/863; 715/788

(58) Field of Classification Search
USPC ................................. 715/863, 788
See application file for complete search history.

(56) References Cited

U.S. PATENT DOCUMENTS

| 7,366,995 | B2 | 4/2008 | Montague | |
|---|---|---|---|---|
| 2006/0288313 | A1* | 12/2006 | Hillis | 715/863 |
| 2007/0176796 | A1* | 8/2007 | Bliss et al. | 340/995.14 |
| 2008/0178126 | A1* | 7/2008 | Beeck et al. | 715/863 |
| 2009/0046110 | A1* | 2/2009 | Sadler et al. | 345/660 |
| 2009/0128516 | A1* | 5/2009 | Rimon et al. | 345/174 |

* cited by examiner

Primary Examiner — Andrea Leggett
(74) Attorney, Agent, or Firm — Fish & Richardson P.C.

(57) ABSTRACT

A computer-implemented user interface method includes receiving a first user selection at a first location on a graphically-displayed object on a graphical user interface, receiving a subsequent user selection, separate from the first user selection, at a second location on the graphically-displayed object, determining a relative orientation between the first location and the second location, and zooming on the graphically-displayed object centered on a point that is along a line between the first location and the second location. A direction of the zooming is determined from the relative orientation of the first location to the second location.

24 Claims, 10 Drawing Sheets

ZOOMING USER INTERFACE INTERACTIONS

CROSS-REFERENCE TO RELATED APPLICATION

This Application claims priority under 35 U.S.C. §119(e) to U.S. Provisional Application Ser. No. 61/045,200 titled "Zooming User Interface Interactions" filed on Apr. 15, 2008, the disclosure of which is incorporated herein by reference.

TECHNICAL FIELD

This document relates to systems and techniques associated with graphical display elements and controls relating to zooming actions on a computing device.

BACKGROUND

More and more, people spend their time interacting with electronic devices—whether in the form of desktop computers, set-top television boxes, mobile devices such as smartphones, or other such devices. People like best those devices that are intuitive to use and whose interactions best meet their expectations regarding how machines should work. They interact with electronics through inputs and outputs from the devices, where the outputs generally are provided audibly and/or on a flat graphical display screen, and the inputs may occur via touch screens, joysticks, mice, 4-directional keypads, and other such input mechanisms.

Fine distinctions in user interfaces can make a world of difference in a user's experience with a device. User interface options may be reduced for mobile devices, where full-sized keyboards or no keyboards at all are available. In such situations, intuitive interaction may be at a premium. The importance of such interaction may be even more pronounced with mobile devices, where the user may need to interact with a device using a single hand.

SUMMARY

This document describes systems and techniques that may be used to interact with a user of a computing device like a mobile telephone or smartphone having a touch screen user interface. In general, the techniques may react in particular ways to selections by a user that indicate an intent to zoom in or out on subject matter that is displayed on the device, such as maps or digital images. For example, a user may tap two areas on a touch screen display that are separated by a distance, to indicate an intent to zoom in or out. The order in which the points are touched (e.g., top-to-bottom vs. bottom-to-top or right-to-left vs. left-to-right) may indicate the direction (i.e., in or out) to zoom; the distance between the points, such as a distance along a horizontal or vertical dimension or axis on the touch screen, may indicate a level of zoom; and the location of the points may indicate the centerpoint of the zoom (e.g., centering the zoom on a point midway between the selected points).

In certain situations, a long press of an input mechanism such as a touch screen display or a clickable trackball, may precede the tapping inputs just described and may serve as an indication by the user that he or she would like to input zooming commands. A long press is a selection that is maintained by a user for a time that is noticeably longer than a simple single press or click selection, and that, in appropriate circumstances, produces an interaction with the user that differs from that of a corresponding simple, or short, press or click. In certain examples, a long press that is executed on a zoomable object such as a map or an image may cause a device to switch into a mode in which subsequent user selections are interpreted as zooming selections. When such a long press occurs, an icon may be displayed to the user on the display to signal to the user that the device is in a mode to receive zooming commands. Subsequent manipulation by the user may change the mode of the device to that of receiving other commands, such as pan or rotate commands, and the icon indicating the current input mode of the display may change accordingly.

In certain implementations, such systems and techniques may provide one or more advantages. For example, permitting a user to indicate desired operations on a visual object itself may save the user from making additional selections, such as by initially invoking an operation from a menu. Also, such selection on the object may allow an interface to devote more screen space to the object (e.g., map) without a need to also display menus of operations that may be performed on the object. Where the user actions are relatively simple and intuitive, the user may also learn them as second nature after a period of owning a device, and may thus be able to perform the actions very quickly and simply, without even having to think about them. Other such operations may also be permitted from similar user actions but in different contexts, by making the system's reactions to user selections contextual. For example, a user's touching of two points on a map may result in a zooming operation in one context and may result in a panning operation in other contexts. In sum, the various techniques mentioned in this document may improve the user experience for a device such as a touch screen smartphone, and may thus cause the user to enjoy the device, recommend it to friends, buy more of the same type of device for themselves, and thus improve the standing of the maker of the device, operating system, or application that is running on the device.

In one implementation, a computer-implemented user interface method is disclosed. The method comprises receiving a first user selection at a first location on a graphically-displayed object on a graphical user interface, receiving a subsequent user selection, separate from the first user selection, at a second location on the graphically-displayed object, determining a relative orientation between the first location and the second location, and zooming on the graphically-displayed object centered on a point that is along a line between the first location and the second location. A direction of the zooming is determined from the relative orientation of the first location to the second location. In one aspect, the first and subsequent user selections comprise touch screen taps. Also, the graphically-displayed object can comprise a map of a geographical area.

In certain aspects, the zooming can be centered approximately on the mid-point of the line between the first location and the second location. The method can also include determining a distance between the first user selection and the subsequent user selection, and computing a level of zooming based on the determined distance. A larger determined distance can result in a greater level of zooming. In addition, the method can further comprise determining that the user selections were intended to be a double tap if the distance between the selections is very small, and determining that the user selections were intended to be a zooming command if the distance between the selections is not very small. The method can also comprise determining a distance between the selections along a horizontal or vertical axis of the interface and determining that the selections were not intended to be a zooming command if the determined distance falls below a set level.

In some aspects, a first selection substantially higher than a subsequent selection is interpreted as a zoom in command, and a first selection substantially lower than a subsequent selection is interpreted as a zoom out command. Moreover, a first selection substantially to the right of a subsequent selection can be interpreted as a zoom in command, and a first selection substantially to the left of a subsequent selection can be interpreted as a zoom out command. The method can also comprise, before receiving the first and subsequent user selections, receiving an initiating user selection indicating an intent to enter zooming parameters, and displaying a zooming icon in response to the initiating user selection. The initiating user selection can comprise a long press input on the graphically-displayed object.

In another implementation, a computer-implemented user interface method is disclosed. The method comprises receiving a first user selection at a first location on a graphically-displayed object on a graphical user interface, receiving a subsequent user selection, separate from the first user selection, at a second location on the graphically-displayed object, determining a distance between the selections along a horizontal or vertical dimension, and zooming on the graphically-displayed object centered substantially on a mid-point of a line connecting the first location and the second location, to a level determined by the determined distance.

In yet another implementation, a computer-implemented user interface system is disclosed that comprises a graphical user interface module to display user selectable zoomable content, a user input mechanism to receive user touch selections in coordination with the user selectable zoomable content, and a processor programmed to compare locations of distinct touch events on the user input mechanism and to cause a zooming action on zoomable content when locations of first and second touch events are separated by a substantial horizontal or vertical distance. The zooming action is centered on a point that is along a line between the location of the first touch event and the location of the second touch event, and the second location and a direction of zooming is determined from the relative orientation of the location of the first touch event and the second touch event.

In certain aspects, the zoomable content comprises a map of a geographical area. The zooming can also be centered approximately on the mid-point of the line between the location of the first touch event and the location of the second touch event. Also, the processor may be further programmed to determine a distance between the first user selection and the subsequent user selection, and compute a level of zooming based on the determined distance.

In another implementation, a tangible media is described. The media has recorded and stored thereon instructions that, when executed, are capable of performing the actions of receiving a first user selection at a first location on a graphically-displayed object on a graphical user interface, receiving a subsequent user selection, separate from the first user selection, at a second location on the graphically-displayed object, determining a relative orientation between the first location and the second location, and zooming on the graphically-displayed object centered on a point that is along a line between the first location and the second location. A direction of the zooming is determined from the relative orientation.

In another implementation, a computer-implemented user interface system is disclosed. The system includes a graphical user interface module to display user selectable zoomable content, a user input mechanism to receive user touch selections in coordination with the user selectable zoomable content, and means for performing a zooming action on the zoomable content in response to user touch selections.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

This document describes systems and techniques by which mobile devices may interact with a user of such devices. For example, users may be able to select items that are part of a graphical user interface in a manner that quickly allows the user to manipulate the items. As one example, certain on-screen items, such as maps or digital images, may have particular, hidden functionality, such as the ability to zoom or pan the items by selecting on them in particular manners. For example, selecting two points on an item with sufficient separation may be accepted by a device as a command to zoom the item near the two points, whereas selecting, holding, and dragging may be accepted as a command to pan in a traditional manner. For zooming, the distance between the selected points, such as the vertical or horizontal distance between the points, may be used as an indication of the degree to which the user wants to zoom, and the zoom can be centered on one of the points (e.g., the first point) or on a center-point of an imaginary line connecting the points.

In other examples, certain actions may be required by a user before zooming, panning, and similar manipulations of an item may occur. For example, a long press on a map may cause a visible control to be displayed with the item, such as a pop-up menu that includes a "zoom" and other selections, or an icon that can be cycled through the same various selections, such as by showing a zoom icon when the icon is first brought up, and then showing a pan icon when the user repeats his or her action on the device, and cycling to other such icons when the user repeats the action again. The particular icons shown may depend on what sort of item is currently being displayed on the device. Thus, for example, a first long press on a map may raise a zoom icon, while a subsequent long press on the map may raise a pan icon.

Figure 1:
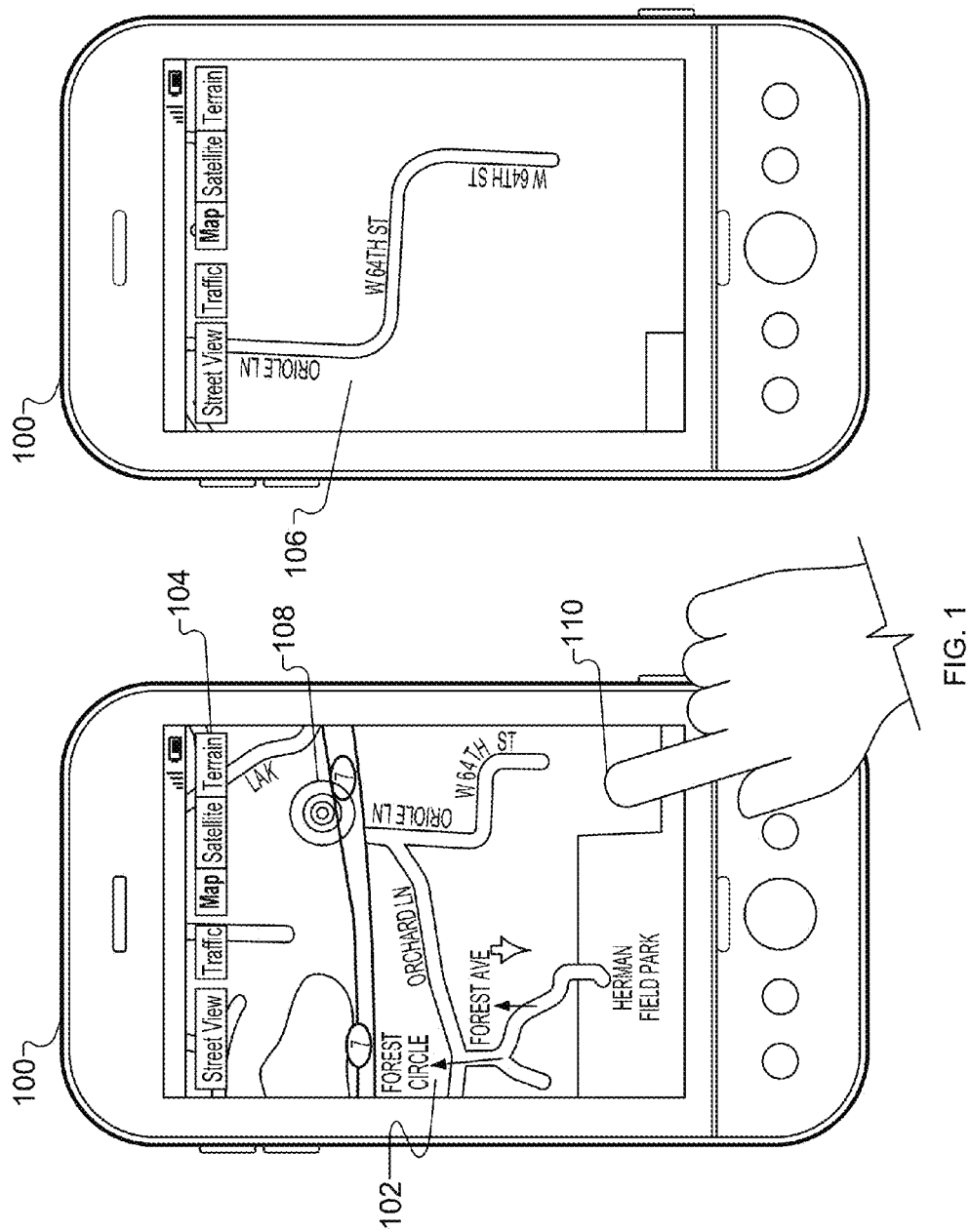
FIG. 1 shows displays on a mobile device exhibiting intuitive zooming behavior.

FIG. 1 shows displays on a mobile device 100 exhibiting intuitive zooming behavior. In this example, the device 100 is initially displaying a map 102 of a geographic area in a residential area, such as using map information served by GOOGLE MAPS. The map 102 is displayed in a familiar manner along with a group of controls 104 by which a user may change the physical appearance of the map 102, such as by changing to a satellite or airplane view. In the map displayed on the left in FIG. 1, the physical area is approximately 800 feet wide, to provide a rough scale.

A location 108 on the device 100 display on top of the map is shown using a group of concentric circles. The location 108 represents a point at which a user of the device 100 has previously selected by pressing with a fingertip or a stylus. Although marked here with concentric circles, the point 108 may or may not be displayed on the device 100 for the user. For example, it may be preferable to display the point in contexts where it is to be an anchor point for subsequent operations, such as if it is to be used as a centerpoint for a subsequent zooming operation. In other circumstances, it may be more intuitive to not display any graphical information at the location 108.

The user is also shown as currently pressing the device 100 display in a second location 110 with a finger. Such a selection may be accepted as a second point, and the two points may be provided as inputs or parameters to a process, such as a zooming process in this example. Each press on the device 100 display may be accepted as an event by the device that is provided to a software module that acts as an event processor, such as may be part of an operating system for the device that interprets events and provides information about the events to the appropriate applications running on the device 100. Where the context of the machine involves presses on a displayed map, the events may be reported to a mapping application that generated the map.

In this example, the mapping application is programmed to process presses on a map in a particular manner. For example, general map presses may have a variety of implications, such as a single long press to bring up a menu or other selectable object (though the OS or another component could produce such a response also), two quick presses (preferably very near each other) to set a pin at a location on the map (e.g., to anchor a location as a starting point for driving directions), a press and drag to pan, and two quick presses at separate locations to zoom in or out. The application may thus initially determine the intent of the user by analyzing factors such as the number of presses, the length of each press, whether a press was accompanied by dragging, the time between each press, and distance between presses, including the absolute distance or the distance in only a vertical or horizontal dimension (i.e., along a Y or X axis of the display).

Once the application has determined the form of operation that has been indicated by a user's selections, it may accept parameters relating to those inputs and perform the operations accordingly. For example, the locations of selections on a display, as correlated to the underlying graphical item, may be relevant to panning, zooming, and other operations.

Such a result of the selections from map 102 are shown on map 106 in the device 100 on the right in FIG. 1. In particular, map 106 is a zoomed-in version of map 102 that follows from the parameters entered by the user. In particular, the user's selection of location 108 followed by a selection of location 110 indicates that the command is to be a zoom in command. In this example, a high selection on the display followed by a low selection is treated as a zoom in command, while a low selection (e.g., location 110) followed by a high selection is treated as a zoom out command. Alternatively, or in addition, side-by-side selections may be treated as zoom in and zoom out commands (e.g., with left followed by right being a zoom in indication).

The centerpoint of the zoom is located, in this example, at the midpoint of the line connecting location 108 and location 110, or approximately the middle of the horizontal portion of W. 64th Street in the example. Such a point is generally intuitive, as a user may typically want to draw around their point of interest. The centerpoint may also be other locations, such as the first selected location, so that the input process is effectively a two-step process: (1) select the zoom centerpoint with a first location, and (2) select a level of zoom with a second location (by indicating its distance from the first point).

The level of zoom in the examples discussed here is related to the distance between the two selected locations 108, 110, which may be an absolute distance or a distance along a particular dimension. For example, it may be intuitive for users to place two points far apart when they want to zoom in a lot or zoom out a lot (because larger distance equates to a greater degree of zooming). Alternatively, a smaller distance may be more intuitive for certain operations, e.g., where selecting two points effectively identifies the top and bottom or other edges of the image that the user wants to have displayed after the item is zoomed in on. The level of zoom may in particular be proportional to the distance between the selected locations, including by being essentially linearly proportional (e.g., a 50% increase in distance equates to a 50% increase in zoom).

Thus, in this manner, a user may be provided with interface mechanisms by which the user can quickly and intuitively change the display of an item such as a map or digital image. In this particular example, the zooming command is inferred from the entered parameters, and no separate selection of a command is required before entering the parameters. The parameters that are entered are also intuitive because the locations correspond to the location of the zooming, and the spacing of the locations correspond to the degree of zoom. As a result, in certain implementations, the entire zoom process may be conducted with only two discrete taps on the display of the device.

Figure 2:
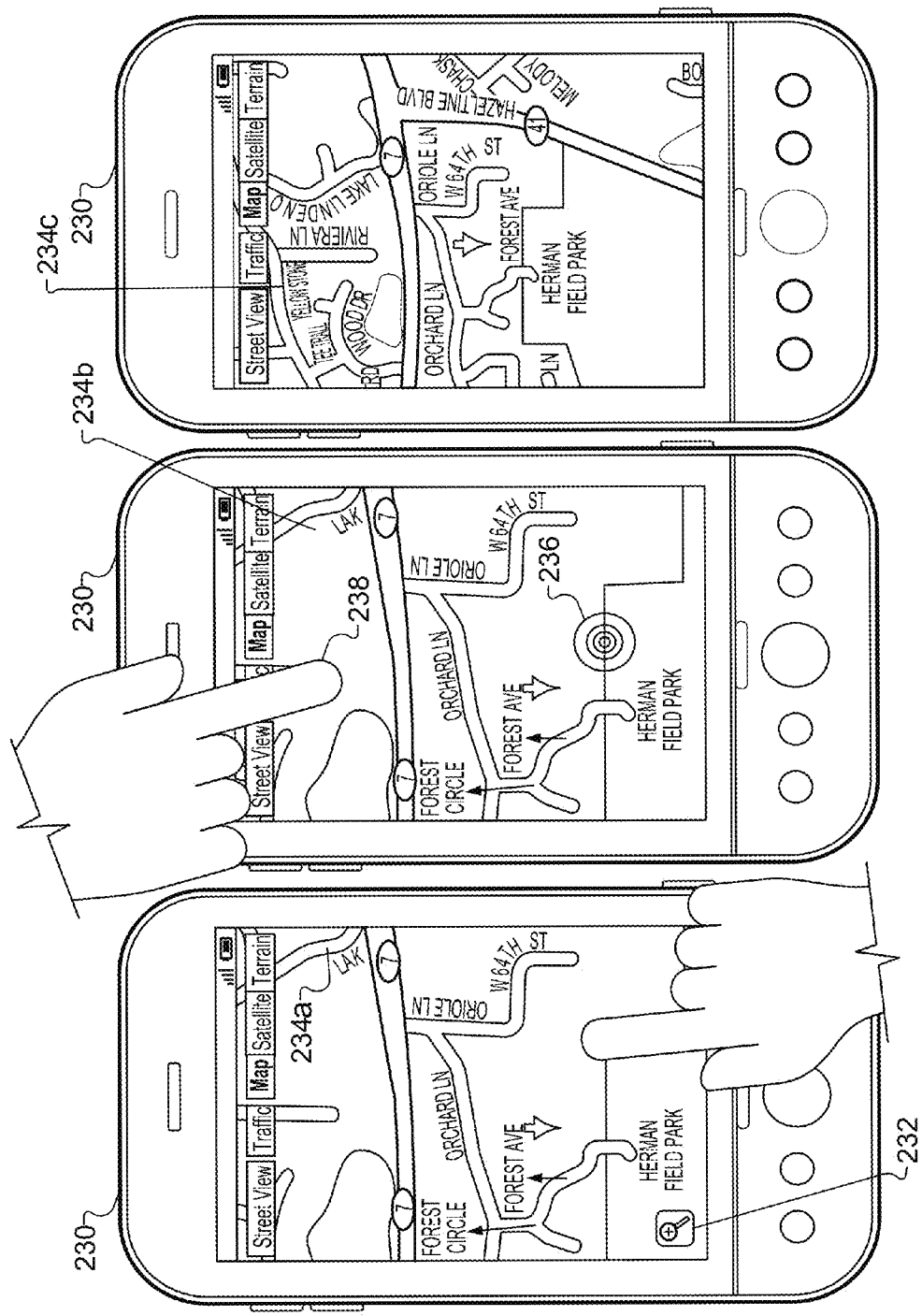
FIG. 2 shows displays on a mobile device exhibiting intuitive zooming behavior that uses a contextual on screen icon.

FIG. 2 shows displays on a mobile device 230 exhibiting intuitive zooming behavior that uses a contextual on-screen icon. Here, three displays are shown of the same mobile device 230, at three different points in time. In general, the user interaction is similar to that shown with FIG. 1, but the entry of zooming parameters by the user is preceded by user entries indicating an intent to perform a zooming operation. Such additional preparatory selections may optionally be used in certain contexts.

In particular, an initial display 234a shows a zoomed in version of a map in the same general area as that shown in FIG. 1. A user's hand is shown in the process of providing a long press to the surface of the touch screen that is displaying the map. Such a long press selection on the map brings up a context-sensitive control 232 that is displayed over the map. In this example, the control is a zooming icon (shown via a graphic of a magnifying lens). That control 232 was selected by the device for display because the context of the user selection, i.e., selection on a zoomable map, suggests the need for such a control. And in this particular example, zooming in is shown as the currently operative mode, by the "+" sign, though the zooming direction may not be dictated by the icon (e.g., where the user is free to indicate zoom direction by the order in which they input their zoom parameters).

Functions other than zooming can be made active on the device by repeating a long press selection on the map. Upon such a second long press selection, the icon for control 232 may change to an image that represents panning, rotating, or another function. Further long presses may change the control 232 to other forms, and the control 232 may ultimately cycle through all possible modes of operation, which may be shown in sequence as icons for control 232. Thus, in one example situation, a user can long press on the map once to bring up the icon having a magnifying glass to represent zooming functionality, and can long press a second time to change the icon to a four-way arrow to represent panning functionality. Other functionalities may also be cycled through, where the particular functionalities are selected to be responsive to the context currently displayed on the device. If a user is running two overlapping applications, a first long press on a first application may bring up an icon for that application, while a second long press on a second application may change the icon to be an icon that matches the context of the second application (where the icon is displayed in the corner of a device display rather than in the corner of each application window).

In other situations, multiple modes may be available at one time. For example, in the display of 234*a*, panning functionality can be made available while the zooming icon is displayed. In particular, zooming can be recognized by the device 230 from separate tap entries that are separated in space, while panning can be recognized by the device by a press that is combined with a hold and drag operation. In short, where two different operations can be achieved by sufficiently distinct input motions, they can both be executed without changing the input mode of the device 230, whereas in other situations it may be preferable to change such modes.

The middle display 234*b* in FIG. 2 shows user interaction after the user has put the device 230 into zoom mode. Location 236 shows a point at which the user has previously touched the display 234*b*, whereas location 238 shows a point at which the user is currently touching. Where the device of FIG. 2 is programmed in the same manner as the device of FIG. 1, such selections by the user indicate an intent to zoom out (because the selection is low followed by high). And again, the distance between the selections indicate a degree of zoom, which here effectively doubles the dimensions of the after-zoom-out display 234*c*.

Also, the control 232, such as in the form of an icon, may be raised in other manners as well. For example, when a user is panning around an item such as a map (e.g., by pressing and dragging on it), the control 232 may be raised. In some situations, the control may default to being a zoom control and to being directed to a certain zoom direction (e.g., it can be a zoom in control if the item is currently zoomed very far out). Alternatively, both directions may be shown, so that the control 232 may have multiple locations on which a user may select to obtain different results. Such a multi-part control may also be displayed in the situations discussed above and below.

Figure 3:
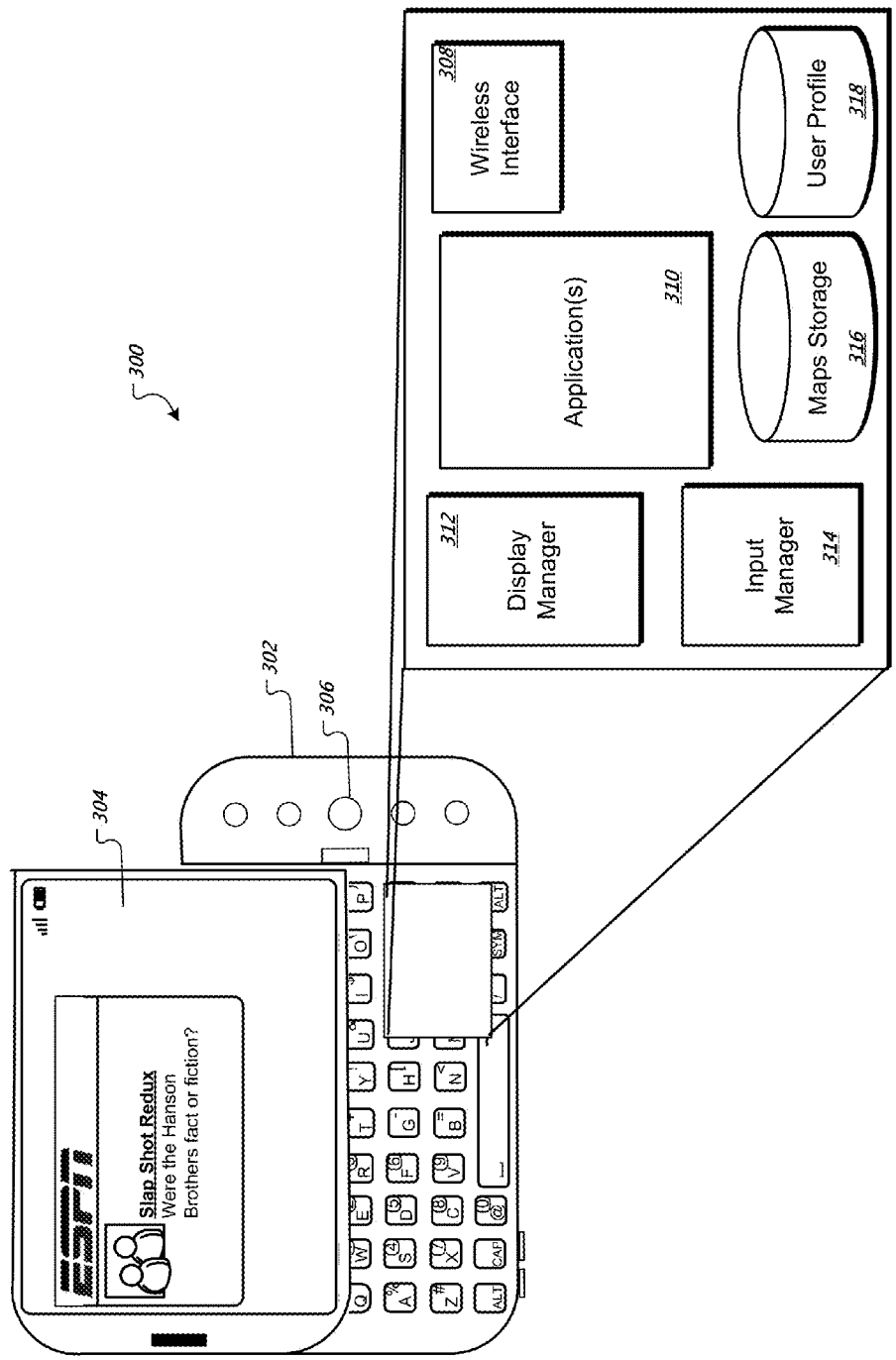
FIG. 3 is a schematic diagram of a system that provides user interaction in response to touch screen inputs.

FIG. 3 is a schematic diagram of a system 300 that provides user interaction in response to touch screen inputs. The system 300 may be implemented using a mobile device such as device 302. The device 302 includes various input and output mechanisms such as a touch screen display 304 and a roller ball 306. A number of components within device 302 may be configured to provide various selection functionality on display 304, such as the long touch and zooming functionality discussed above.

One such component is a display manager 312, which may be responsible for rendering content for presentation on display 304. The display manager 312 may receive graphic-related content from a number of sources and may determine how the content is to be provided to a user. For example, a number of different windows for various applications 310 on the device 302 may need to be displayed, and the display manager 312 may determine which to display, which to hide, and what to display or hide when there is overlap between various graphical objects. The display manager 312 may also be responsible for displaying icons like those discussed above, that may provide a user with an indication that a particular mode of input is currently in operation for the device 302.

An input manager 314 may be responsible for translating commands provided by a user of device 302. For example, such commands may come from a keyboard, from touch screen display 304, from trackball 306, or from other such sources, including dedicated buttons or soft buttons (e.g., buttons whose functions may change over time, and whose functions may be displayed on areas of display 304 that are adjacent to the particular buttons). The input manager 314 may determine, for example, in what area of the display commands are being received, and thus for which application being shown on the display the commands are intended. In addition, the input manager 314 may interpret input motions on the touch screen 304 into a common format and pass those interpreted motions (e.g., short press, long press, straight-line drags, and inputs involving more than one tap) to the appropriate application. The input manager 314 may also report such inputs to an event manager (not shown) that in turn reports them to the appropriate modules or applications.

A variety of applications 310 may operate, generally on a common microprocessor, on the device 302. The applications 310 may take a variety of forms, such as mapping applications, e-mail and other messaging applications, web browser applications, and various applications running within a web browser or running extensions of a web browser. The applications may be components of an operating system for the device or may be traditional applications operating on the operating system. An application such as a mapping application may receive messages from the input manager 314 when a user makes a selection that is relevant to the particular application, such as by tapping or dragging on a map that is controlled by the mapping application. Other such selections by a user, as discussed above and below, may also be communicated to the mapping application, which may in turn respond through the display manager 312, to affect the visual interface that is shown to the user.

A wireless interface 308 manages communication with a wireless network, which may be a data network that also carries voice communications. The wireless interface may operate in a familiar manner, such as according to the examples discussed below, and may provide for communication by the device 302 with messaging service such as text messaging, e-mail, and telephone voice mail messaging. In addition, the wireless interface 308 may support downloads and uploads of content and computer code over a wireless network.

Various forms of persistent storage may be provided, such as using fixed disk drives and/or solid state memory devices. Two examples are shown here. First, maps storage 316 includes data representing one or more geographic maps that may be displayed on device 302. The maps storage 316 may include a limited number of maps, such as a single map, in memory shared with many other components of the system 300 where the device 302 uses a web browser or similar system to access on-line maps. Also, the storage may be less persistent, and a limited number of map tiles may be downloaded from a central server at any one time, where the downloaded tiles are those tiles that surround an area that the user is currently viewing on a mapping application. Alternatively, a number of maps for an entire geographic area may be loaded into map storage 316 and used by device 302 to reduce the need to download map content while the device 302 is being used. Such map content may be manipulated in manners like those discussed above. In a similar manner, binary files representing digital images may also be stored with the system.

Other storage includes a user profile 318, which may be stored on the same media as maps storage 316. The user profile 318 includes various parameters about a user of the device 302. In the example relevant here, the user profile may include data defining the length of a long press period for the user, among other things, such as the speed for a double press or double tap by the user, the speed with which trackball 306 movements are to result in on-screen movements of a pointer, particular actions that are to be achieved by various touch inputs, and other such factors. In addition, the user may identify the types of actions that they would like to have result in zooming actions like those discussed above.

Using the pictured components, and others that are omitted here for clarity, the device 302 may provide particular actions in response to user inputs. Specifically, the device 302 may respond to long press inputs in particular ways, including by initially displaying an icon on the display 304, where the icon represents an input mode in which the device has been placed. The device 302 may then be configured to receive selections on a displayed item such as a map, where, for example, separate taps in to distinct locations on the display may be interpreted as a command to zoom in or out around the area of the taps, in a direction indicated by the order of the taps, and to a degree represented by a distance between the taps.

Figure 4A:
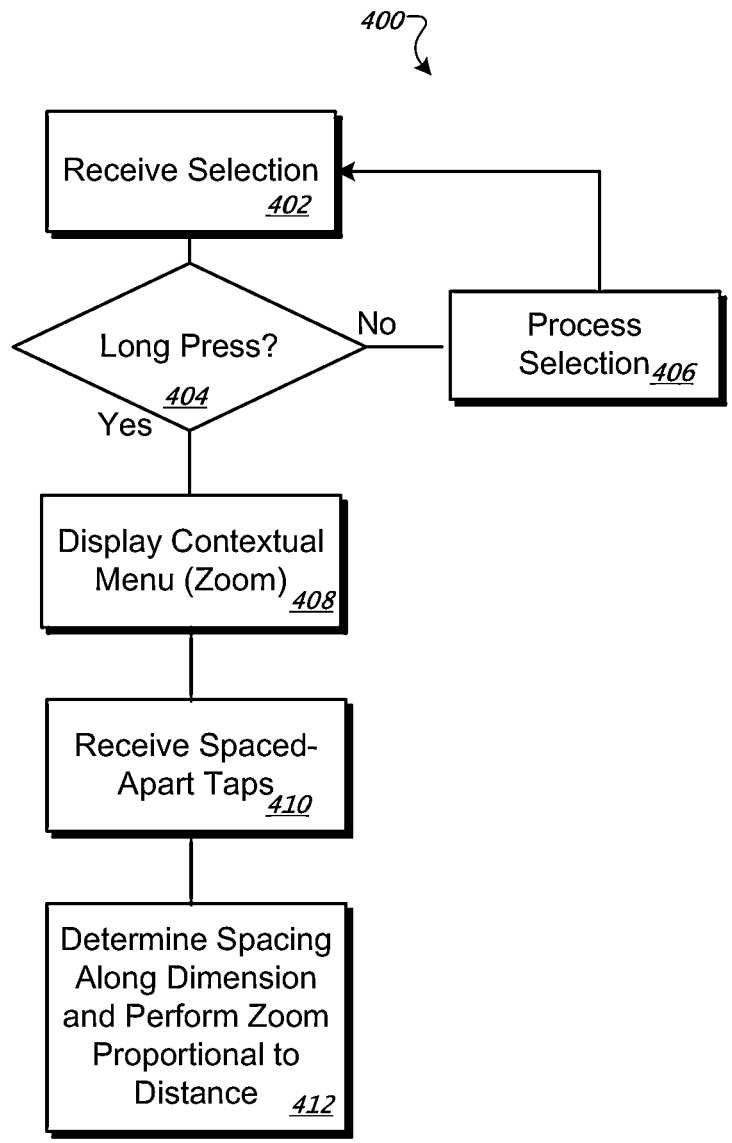
FIGS. 4A-4B are flow charts of example processes for receiving user selections from graphical user interface.
Figure 4B:
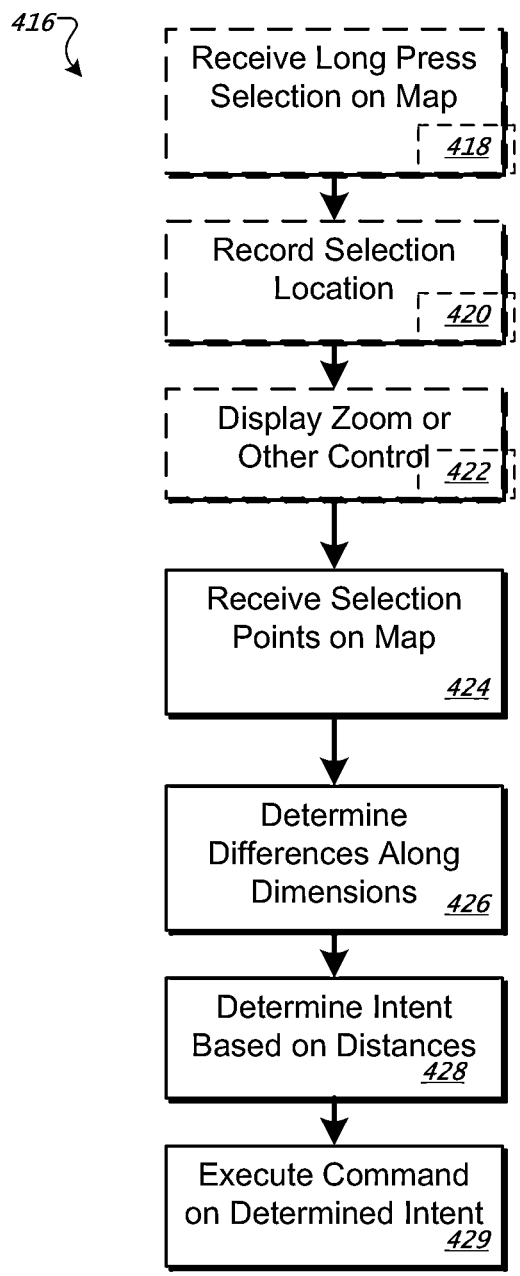

FIGS. 4A-4B are flow charts of example processes for receiving user selections from graphical user interfaces. FIG. 4A shows, for example, a process 400 by which a mobile device may respond to a selection for zooming on a zoomable graphical item, such as a map. The zooming commands may happen immediately on the device, or, as is shown here, may be preceded by inputs that indicate an intent to enter zooming commands and can result in a device indicating that it is in a mode to receive zooming commands.

The example process 400 begins at box 402, where a selection is received on the mobile device. The selection may include, for example, a finger press (or stylus press) on a touch screen input device, or a pressing of a button or trackball on a device.

At box 404, the process 400 determines whether sufficient time has expired for a long press period on the device. If such a time period has not yet expired, the process 400 determines whether the selected item exhibits long press functionality. If it does not, the process 400 simply continues waiting for an up press event. If it does, a contextual menu such as a zoom icon or contextual menu may be displayed as soon as the long press period has expired (box 406). If an up press event occurs before a long press period has expired, then the selection is interpreted as a tap or short press selection, and the appropriate selection is processed (box 406) by the process 400.

Where a long press has occurred and an icon, contextual menu, or similar visual item is displayed, the system may wait for user input on the visual element. For example, a contextual menu may include a pop up menu that appears over or near the location selected by the use, for example (box 408). Where the item appears in the form of an icon, the system processes relevant input events, such as an event of two spaced-apart taps on the display (box 410). The system, such as in an operating system component or as part of an application, may initially determine that the taps meet the profile for being a zooming function (e.g., sufficiently spaced apart in location but sufficient close in time), and if such input is determined to have occurred, the process 400 determines the space between the locations along a dimension such as a vertical or horizontal dimension along the display for the device, and performs a zoom that is proportional to the distance between the selections on the display (box 412). The process 400 may also determine the order of the selections, such as by constructing a vector between the selections and determining a direction of the vector, so as to determine the appropriate direction (in or out) for the zooming. Such analysis of taps by a device may occur without preliminary entries by a user to show an initial intent to place the device into a zooming mode. Rather, the device may automatically interpret any two spaced-apart taps on an item like a map as a zooming command and may automatically perform the zooming operation that is suggested by such taps.

FIG. 4B shows an example process 416 by which a long press input and a zooming input may be handled by a mapping application. The process 416 starts at box 418, where a long press selection is received on a map generated by the mapping application. At box 420, the location of the long press is recorded, such as in relation to a particular point on a map. In appropriate circumstances, the long press selection may then cause a zoom control or other such control to be displayed (box 422). Boxes 418-422 are shown here in dashed lines to indicate that such selection to put a device into zooming made may be optional, such as where particular navigation selections on an item such as a map make a user's intent discernable on their own.

The user may then enter zoom selections on the map in various manners (box 424). For example, the location of the long press may be treated as an initial zoom location, so that only one additional selection is required. Alternatively, selections may be made at two locations, such as a high location and a low location, in manners like those described above. As noted, a long press selection may not be needed, and two short tap selections may be sufficient by themselves to indicate an intent to have a device zoom in or out on an item.

With the zoom locations input by the user, those locations may be interpreted in various manners to determine a direction of zoom, a centerpoint of the zoom, and a degree of zoom. For example, at box 426, a difference in distance between the locations may be determined, such as a distance along a particular dimension or axis of the display, or along a vector between the locations, etc. The distances may be used to determine the user's intent, such as where two taps in the same or substantially the same location may indicate an intent to select an item or placing another item (e.g., a pin) on the item (e.g., a map), whereas two taps at separated locations may indicate an intent to zoom in or out, depending on the relative spacing of the locations (box 428).

At box 429, the process 416 executes an inferred command on the determined or inferred intent. In this example, the command is a zoom command that is inferred from the context (i.e., displaying a map) and the parameters of the inputs (e.g., quick taps separated by a substantial distance). The parameters for the command are further determined from the distance between the taps, the general location of the taps, and the relative position of the taps to each other. The user may then select an object to indicate an intent to have a zooming control removed, in situations where the control has been displayed on a device.

Figure 5:
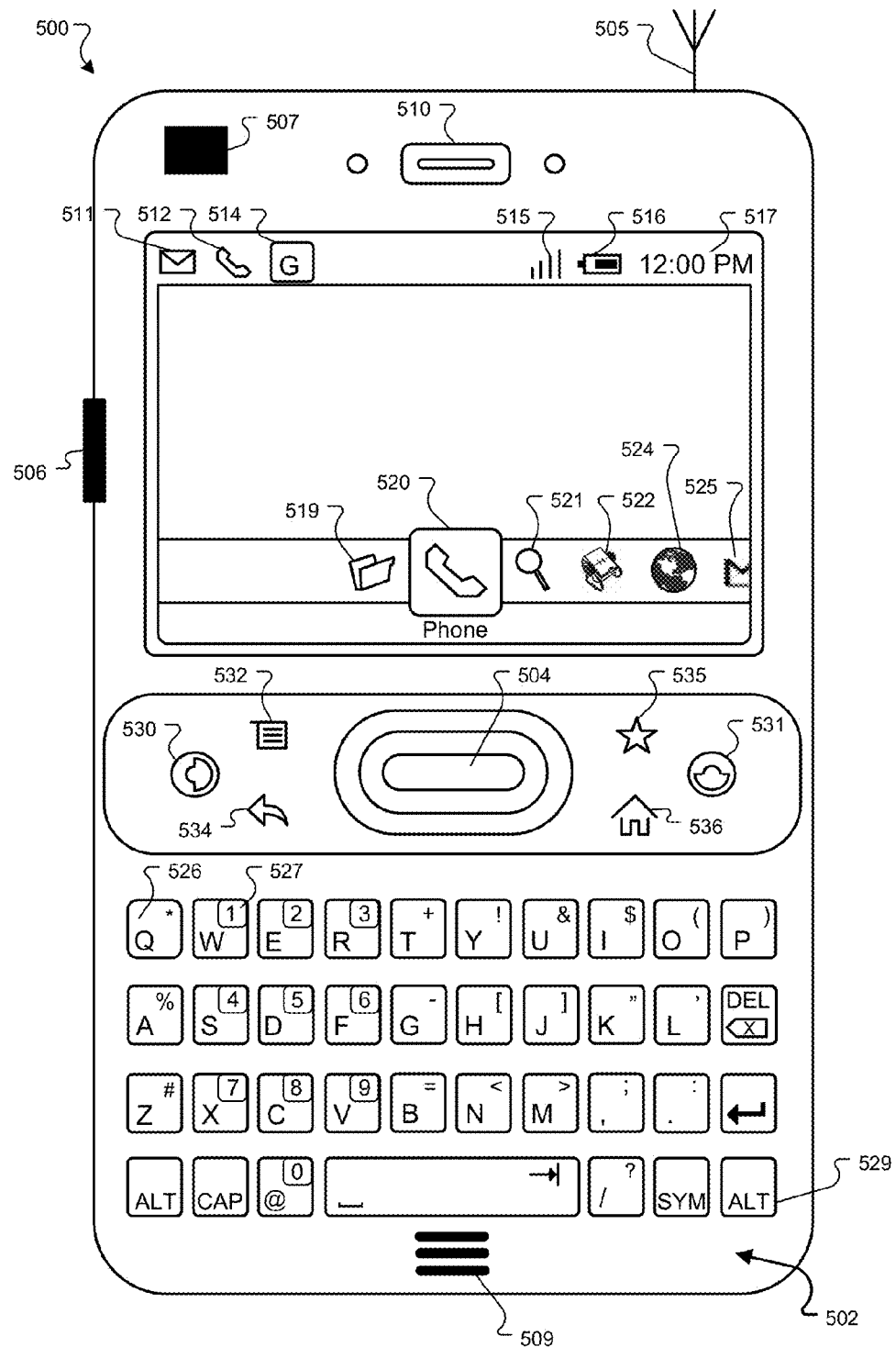
FIG. 5 is a schematic representation of an exemplary mobile device that implements embodiments of the notification techniques described herein.

Referring now to FIG. 5, the exterior appearance of an exemplary device 500 that implements the user interface features described here is illustrated. Briefly, and among other things, the device 500 includes a processor configured to display notifications regarding events on the device 500, and to permit a user to conveniently "pull down" detail about the events relating to the notifications into an extended view of the events.

In more detail, the hardware environment of the device 500 includes a display 501 for displaying text, images, and video to a user; a keyboard 502 for entering text data and user commands into the device 500; a pointing device 504 for pointing, selecting, and adjusting objects displayed on the display 501; an antenna 505; a network connection 506; a camera 507; a microphone 509; and a speaker 510. Although the device 500 shows an external antenna 505, the device 500 can include an internal antenna, which is not visible to the user.

The display 501 can display video, graphics, images, and text that make up the user interface for the software applications used by the device 500, and the operating system programs used to operate the device 500. Among the possible elements that may be displayed on the display 501 are a new mail indicator 511 that alerts a user to the presence of a new message; an active call indicator 512 that indicates that a telephone call is being received, placed, or is occurring; a data standard indicator 514 that indicates the data standard currently being used by the device 500 to transmit and receive data; a signal strength indicator 515 that indicates a measurement of the strength of a signal received by via the antenna 505, such as by using signal strength bars; a battery life indicator 516 that indicates a measurement of the remaining battery life; or a clock 517 that outputs the current time.

The display 501 may also show application icons representing various applications available to the user, such as a web browser application icon 519, a phone application icon 520, a search application icon 521, a contacts application icon 522, a mapping application icon 524, an email application icon 525, or other application icons. In one example implementation, the display 501 is a quarter video graphics array (QVGA) thin film transistor (TFT) liquid crystal display (LCD), capable of 16-bit or better color.

A user uses the keyboard (or "keypad") 502 to enter commands and data to operate and control the operating system and applications that provide for responding to notification of alerts and responding to messages and the like (and also to a touch screen). The keyboard 502 includes standard keyboard buttons or keys associated with alphanumeric characters, such as keys 526 and 527 that are associated with the alphanumeric characters "Q" and "W" when selected alone, or are associated with the characters "*" and "1" when pressed in combination with key 529. A single key may also be associated with special characters or functions, including unlabeled functions, based upon the state of the operating system or applications invoked by the operating system. For example, when an application calls for the input of a numeric character, a selection of the key 527 alone may cause a "1" to be input.

In addition to keys traditionally associated with an alphanumeric keypad, the keyboard 502 also includes other special function keys, such as an establish call key 530 that causes a received call to be answered or a new call to be originated; a terminate call key 531 that causes the termination of an active call; a drop down menu key 532 that causes a menu to appear within the display 501; a backward navigation key 534 that causes a previously accessed network address to be accessed again; a favorites key 535 that causes an active web page to be placed in a bookmarks folder of favorite sites, or causes a bookmarks folder to appear; a home page key 536 that causes an application invoked on the device 500 to navigate to a predetermined network address; or other keys that provide for multiple-way navigation, application selection, and power and volume control.

The user uses the pointing device 504 to select and adjust graphics and text objects displayed on the display 501 as part of the interaction with and control of the device 500 and the applications invoked on the device 500. The pointing device 504 is any appropriate type of pointing device, and may be a joystick, a trackball, a touch-pad, a camera, a voice input device, a touch screen device implemented in combination with the display 501, or any other input device.

The antenna 505, which can be an external antenna or an internal antenna, is a directional or omni-directional antenna used for the transmission and reception of radiofrequency (RF) signals that implement point-to-point radio communication, wireless local area network (LAN) communication, or location determination. The antenna 505 may facilitate point-to-point radio communication using the Specialized Mobile Radio (SMR), cellular, or Personal Communication Service (PCS) frequency bands, and may implement the transmission of data using any number or data standards. For example, the antenna 505 may allow data to be transmitted between the device 500 and a base station using technologies such as Wireless Broadband (WiBro), Worldwide Interoperability for Microwave ACCess (WiMAX), 5GPP Long Term Evolution (LTE), Ultra Mobile Broadband (UMB), High Performance Radio Metropolitan Network (HIPERMAN), iBurst or High Capacity Spatial Division Multiple Access (HC-SDMA), High Speed OFDM Packet Access (HSOPA), High-Speed Packet Access (HSPA), HSPA Evolution, HSPA+, High Speed Upload Packet Access (HSUPA), High Speed Downlink Packet Access (HSDPA), Generic Access Network (GAN), Time Division-Synchronous Code Division Multiple Access (TD-SCDMA), Evolution-Data Optimized (or Evolution-Data Only) (EVDO), Time Division-Code Division Multiple Access (TD-CDMA), Freedom Of Mobile Multimedia Access (FOMA), Universal Mobile Telecommunications System (UMTS), Wideband Code Division Multiple Access (W-CDMA), Enhanced Data rates for GSM Evolution (EDGE), Enhanced GPRS (EGPRS), Code Division Multiple Access-2000 (CDMA2000), Wideband Integrated Dispatch Enhanced Network (WiDEN), High-Speed Circuit-Switched Data (HSCSD), General Packet Radio Service (GPRS), Personal Handy-Phone System (PHS), Circuit Switched Data (CSD), Personal Digital Cellular (PDC), CDMAone, Digital Advanced Mobile Phone System (D-AMPS), Integrated Digital Enhanced Network (IDEN), Global System for Mobile communications (GSM), DataTAC, Mobitex, Cellular Digital Packet Data (CDPD), Hicap, Advanced Mobile Phone System (AMPS), Nordic Mobile Phone (NMP), Autoradiopuhelin (ARP), Autotel or Public Automated Land Mobile (PALM), Mobiltelefonisystem D (MTD), Offentlig Landmobil Telefoni (OLT), Advanced Mobile Telephone System (AMTS), Improved Mobile Telephone Service (IMTS), Mobile Telephone System (MTS), Push-To-Talk (PTT), or other technologies. Communication via W-CDMA, HSUPA, GSM, GPRS, and EDGE networks may occur, for example, using a QUALCOMM MSM7200A chipset with an QUALCOMM RTR6285 transceiver and PM7540power management circuit.

The wireless or wired computer network connection 506 may be a modem connection, a local-area network (LAN) connection including the Ethernet, or a broadband wide-area network (WAN) connection such as a digital subscriber line (DSL), cable high-speed internet connection, dial-up connection, T-1 line, T-3 line, fiber optic connection, or satellite connection. The network connection 506 may connect to a LAN network, a corporate or government WAN network, the Internet, a telephone network, or other network. The network connection 506 uses a wired or wireless connector. Example wireless connectors include, for example, an INFRARED DATA ASSOCIATION (IrDA) wireless connector, a Wi-Fi wireless connector, an optical wireless connector, an INSTITUTE OF ELECTRICAL AND ELECTRONICS ENGINEERS (IEEE) Standard 802.11 wireless connector, a BLUETOOTH wireless connector (such as a BLUETOOTH version 1.2 or 5.0 connector), a near field communications (NFC) connector, an orthogonal frequency division multiplexing (OFDM) ultra wide band (UWB) wireless connector, a time-modulated ultra wide band (TM-UWB) wireless connector, or other wireless connector. Example wired connectors include, for example, a IEEE-1394 FIREWIRE connector, a Universal Serial Bus (USB) connector (including a mini-B USB interface connector), a serial port connector, a parallel port connector, or other wired connector. In another implementation, the functions of the network connection 506 and the antenna 505 are integrated into a single component.

The camera 507 allows the device 500 to capture digital images, and may be a scanner, a digital still camera, a digital video camera, other digital input device. In one example implementation, the camera 507 is a 5 mega-pixel (MP) camera that utilizes a complementary metal-oxide semiconductor (CMOS).

The microphone 509 allows the device 500 to capture sound, and may be an omni-directional microphone, a unidirectional microphone, a bi-directional microphone, a shotgun microphone, or other type of apparatus that converts sound to an electrical signal. The microphone 509 may be used to capture sound generated by a user, for example when the user is speaking to another user during a telephone call via the device 500. Conversely, the speaker 510 allows the device to convert an electrical signal into sound, such as a voice from another user generated by a telephone application program, or a ring tone generated from a ring tone application program. Furthermore, although the device 500 is illustrated in FIG. 5 as a handheld device, in further implementations the device 500 may be a laptop, a workstation, a midrange computer, a mainframe, an embedded system, telephone, desktop PC, a tablet computer, a PDA, or other type of computing device.

Figure 6:
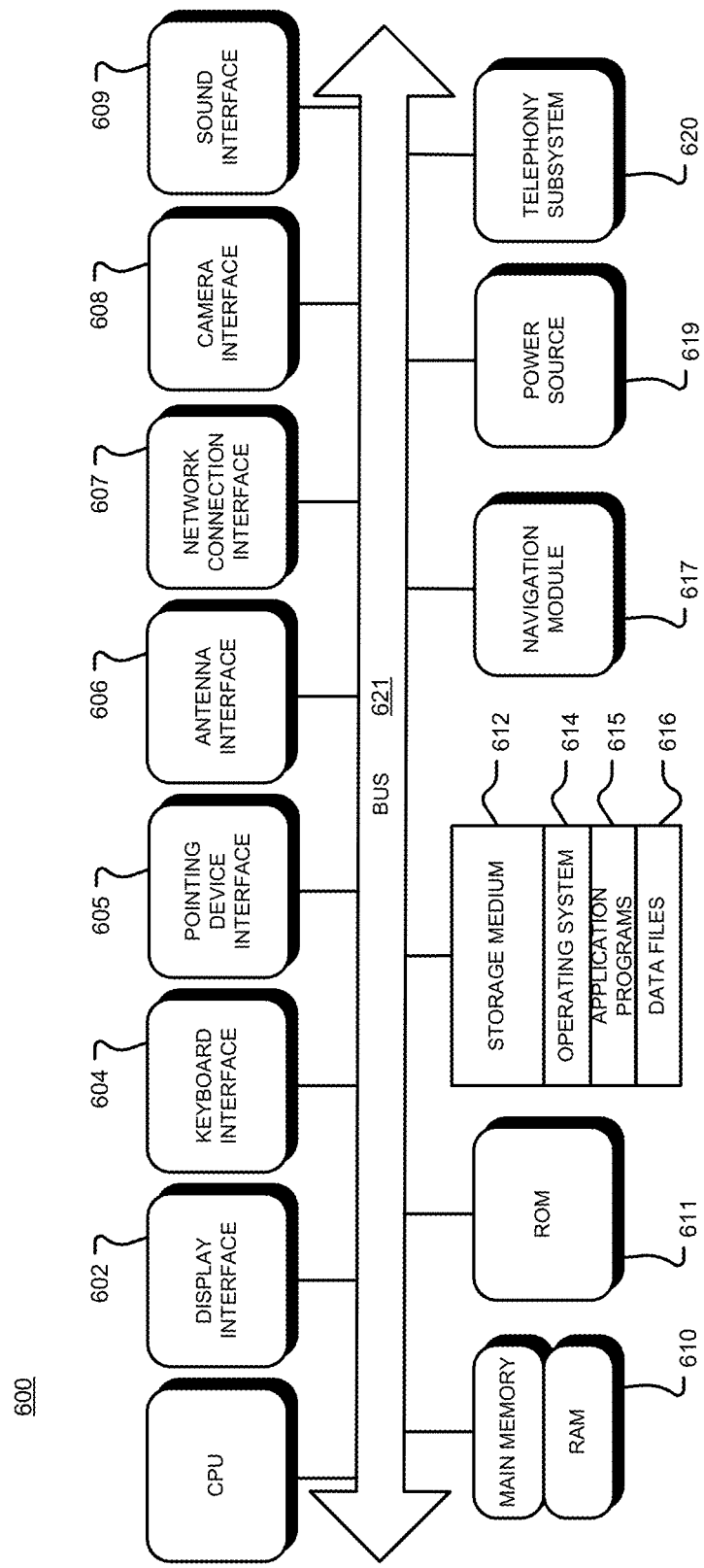
FIG. 6 is a block diagram illustrating the internal architecture of the device of FIG. 5.

FIG. 6 is a block diagram illustrating an internal architecture 600 of the device 500. The architecture includes a central processing unit (CPU) 601 where the computer instructions that comprise an operating system or an application are processed; a display interface 602 that provides a communication interface and processing functions for rendering video, graphics, images, and texts on the display 501, provides a set of built-in controls (such as buttons, text and lists), and supports diverse screen sizes; a keyboard interface 604 that provides a communication interface to the keyboard 502; a pointing device interface 605 that provides a communication interface to the pointing device 504; an antenna interface 606 that provides a communication interface to the antenna 505; a network connection interface 607 that provides a communication interface to a network over the computer network connection 506; a camera interface 608 that provides a communication interface and processing functions for capturing digital images from the camera 507; a sound interface 609 that provides a communication interface for converting sound into electrical signals using the microphone 509 and for converting electrical signals into sound using the speaker 510; a random access memory (RAM) 610 where computer instructions and data are stored in a volatile memory device for processing by the CPU 601; a read-only memory (ROM) 611 where invariant low-level systems code or data for basic system functions such as basic input and output (I/O), startup, or reception of keystrokes from the keyboard 502 are stored in a non-volatile memory device; a storage medium 612 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files that comprise an operating system 614, application programs 615 (including, for example, a web browser application, a widget or gadget engine, and or other applications, as necessary) and data files 616 are stored; a navigation module 617 that provides a real-world or relative position or geographic location of the device 500; a power source 619 that provides an appropriate alternating current (AC) or direct current (DC) to power components; and a telephony subsystem 620 that allows the device 500 to transmit and receive sound over a telephone network. The constituent devices and the CPU 601 communicate with each other over a bus 621.

The CPU 601 can be one of a number of computer processors. In one arrangement, the computer CPU 601 is more than one processing unit. The RAM 610 interfaces with the computer bus 621 so as to provide quick RAM storage to the CPU 601 during the execution of software programs such as the operating system application programs, and device drivers. More specifically, the CPU 601 loads computer-executable process steps from the storage medium 612 or other media into a field of the RAM 610 in order to execute software programs. Data is stored in the RAM 610, where the data is accessed by the computer CPU 601 during execution. In one example configuration, the device 500 includes at least 128 MB of RAM, and 256 MB of flash memory.

The storage medium 612 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow the device 500 to access computer-executable process steps, application programs and the like, stored on removable and non-removable memory media, to off-load data from the device 500, or to upload data onto the device 500.

A computer program product is tangibly embodied in storage medium 612, a machine-readable storage medium. The computer program product includes instructions that, when read by a machine, operate to cause a data processing apparatus to store image data in the mobile device. In some embodiments, the computer program product includes instructions that generate notifications about alerts such as newly arriving messages on the device.

The operating system 614 may be a LINUX-based operating system such as the GOOGLE mobile device platform; APPLE MAC OS X; MICROSOFT WINDOWS NT/WINDOWS 2000/WINDOWS XP/WINDOWS MOBILE; a variety of UNIX-flavored operating systems; or a proprietary operating system for computers or embedded systems. The application development platform or framework for the operating system 614 may be: BINARY RUNTIME ENVIRONMENT FOR WIRELESS (BREW); JAVA Platform, Micro Edition (JAVA ME) or JAVA 2 Platform, Micro Edition (J2ME) using the SUN MICROSYSTEMS JAVASCRIPT programming language; PYTHON FLASH LITE, or MICROSOFT .NET Compact, or another appropriate environment.

The device stores computer-executable code for the operating system 614, and the application programs 615 such as an email, instant messaging, a video service application, a mapping application word processing, spreadsheet, presentation, gaming, mapping, web browsing, JAVASCRIPT engine, or other applications. For example, one implementation may allow a user to access the GOOGLE GMAIL email application, the GOOGLE TALK instant messaging application, a YOUTUBE video service application, a GOOGLE MAPS or GOOGLE EARTH mapping application, or a GOOGLE PICASA imaging editing and presentation application. The application programs 615 may also include a widget or gadget engine, such as a TAFRI widget engine, a MICROSOFT gadget engine such as the WINDOWS SIDEBAR gadget engine or the KAPSULES gadget engine, a YAHOO! widget engine such as the KONFABULTOR widget engine, the APPLE DASHBOARD widget engine, the GOOGLE gadget engine, the KLIPFOLIO widget engine, an OPERA widget engine, the WIDSETS widget engine, a proprietary widget or gadget engine, or other widget or gadget engine the provides host system software for a physically-inspired applet on a desktop.

Although it is possible to provide for notifications and interactions with messages and other events using the above-described implementation, it is also possible to implement the functions according to the present disclosure as a dynamic link library (DLL), or as a plug-in to other application programs such as an Internet web-browser such as the FOXFIRE web browser, the APPLE SAFARI web browser or the MICROSOFT INTERNET EXPLORER web browser.

The navigation module 617 may determine an absolute or relative position of the device, such as by using the Global Positioning System (GPS) signals, the GLObal NAvigation Satellite System (GLONASS), the Galileo positioning system, the Beidou Satellite Navigation and Positioning System, an inertial navigation system, a dead reckoning system, or by accessing address, Internet protocol (IP) address, or location information in a database. The navigation module 617 may also be used to measure angular displacement, orientation, or velocity of the device 500, such as by using one or more accelerometers.

Figure 7:
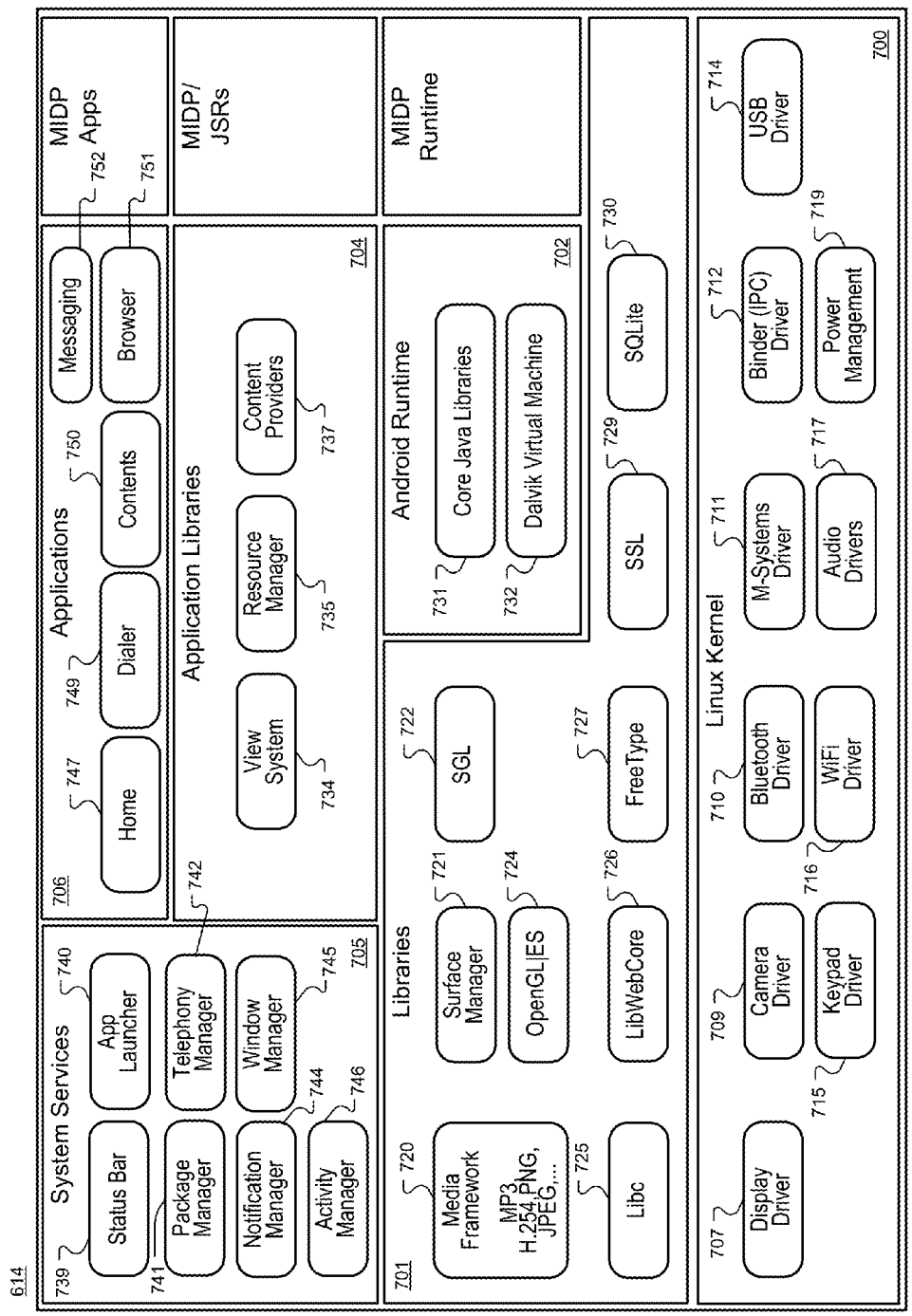
FIG. 7 is a block diagram illustrating exemplary components of the operating system used by the device of FIG. 5.

FIG. 7 is a block diagram illustrating exemplary components of the operating system 614 used by the device 500, in the case where the operating system 614 is the GOOGLE mobile device platform. The operating system 614 invokes multiple processes, while ensuring that the associated phone application is responsive, and that wayward applications do not cause a fault (or "crash") of the operating system. Using task switching, the operating system 614 allows for the switching of applications while on a telephone call, without losing the state of each associated application. The operating system 614 may use an application framework to encourage reuse of components, and provide a scalable user experience by combining pointing device and keyboard inputs and by allowing for pivoting. Thus, the operating system can provide a rich graphics system and media experience, while using an advanced, standards-based web browser.

The operating system 614 can generally be organized into six components: a kernel 700, libraries 701, an operating system runtime 702, application libraries 704, system services 705, and applications 706. The kernel 700 includes a display driver 707 that allows software such as the operating system 614 and the application programs 715 to interact with the display 501 via the display interface 602, a camera driver 709 that allows the software to interact with the camera 507; a BLUETOOTH driver 710; a M-Systems driver 711; a binder (IPC) driver 712, a USB driver 714 a keypad driver 715 that allows the software to interact with the keyboard 502 via the keyboard interface 604; a WiFi driver 716; audio drivers 717 that allow the software to interact with the microphone 509 and the speaker 510 via the sound interface 609; and a power management component 719 that allows the software to interact with and manage the power source 719.

The BLUETOOTH driver, which in one implementation is based on the BlueZ BLUETOOTH stack for LINUX-based operating systems, provides profile support for headsets and hands-free devices, dial-up networking, personal area networking (PAN), or audio streaming (such as by Advance Audio Distribution Profile (A2DP) or Audio/Video Remote Control Profile (AVRCP). The BLUETOOTH driver provides JAVA bindings for scanning, pairing and unpairing, and service queries.

The libraries 701 include a media framework 720 that supports standard video, audio and still-frame formats (such as Moving Picture Experts Group (MPEG)-4, H.264, MPEG-1 Audio Layer-3 (MP3), Advanced Audio Coding (AAC), Adaptive Multi-Rate (AMR), Joint Photographic Experts Group (JPEG), and others) using an efficient JAVA Application Programming Interface (API) layer; a surface manager 721; a simple graphics library (SGL) 722 for two-dimensional application drawing; an Open Graphics Library for Embedded Systems (OpenGL ES) 724 for gaming and three-dimensional rendering; a C standard library (LIBC) 725; a LIBWEBCORE library 726; a FreeType library 727; an SSL 729; and an SQLite library 730.

The operating system runtime 702 includes core JAVA libraries 731, and a Dalvik virtual machine 732. The Dalvik virtual machine 732 is a custom, virtual machine that runs a customized file format (.DEX).

The operating system 614 can also include Mobile Information Device Profile (MIDP) components such as the MIDP JAVA Specification Requests (JSRs) components, MIDP runtime, and MIDP applications as shown in FIG. 7. The MIDP components can support MIDP applications running on the device 500.

With regard to graphics rendering, a system-wide composer manages surfaces and a frame buffer and handles window transitions, using the OpenGL ES 724 and two-dimensional hardware accelerators for its compositions.

The Dalvik virtual machine 732 may be used with an embedded environment, since it uses runtime memory very efficiently, implements a CPU-optimized bytecode interpreter, and supports multiple virtual machine processes per device. The custom file format (DEX) is designed for runtime efficiency, using a shared constant pool to reduce memory, read-only structures to improve cross-process sharing, concise, and fixed-width instructions to reduce parse time, thereby allowing installed applications to be translated into the custom file formal at build-time. The associated byte-codes are designed for quick interpretation, since register-based instead of stack-based instructions reduce memory and dispatch overhead, since using fixed width instructions simplifies parsing, and since the 16-bit code units minimize reads.

The application libraries 704 include a view system 734, a resource manager 735, and content providers 737. The system services 705 includes a status bar 739; an application launcher 740; a package manager 741 that maintains information for all installed applications; a telephony manager 742 that provides an application level JAVA interface to the telephony subsystem 620; a notification manager 744 that allows all applications access to the status bar and on-screen notifications; a window manager 745 that allows multiple applications with multiple windows to share the display 501; and an activity manager 746 that runs each application in a separate process, manages an application life cycle, and maintains a cross-application history.

The applications 706 include a home application 747, a dialer application 749, a contacts application 750, and a browser application 751. Each of the applications may generate graphical elements that either do or do not have long press interactions. As described above, those that do not have long press interactions may provide no immediate visual feedback when they are first pressed, while those that do have such interactions may be highlighted between the time they are first pressed and the expiration of the long press period. Also, the highlighting may not occur exactly upon a press, so that mere tapping of an item does not cause it to be highlighted; instead, the highlighting may occur upon the expiration of a short press period that is slightly more than the time period for a tap, but appreciably shorter than a long press period.

The telephony manager 742 provides event notifications (such as phone state, network state, Subscriber Identity Module (SIM) status, or voicemail status), allows access to state information (such as network information, SIM information, or voicemail presence), initiates calls, and queries and controls the call state. The browser application 751 renders web pages in a full, desktop-like manager, including navigation functions. Furthermore, the browser application 751 allows single column, small screen rendering, and provides for the embedding of HTML views into other applications.

Figure 8:
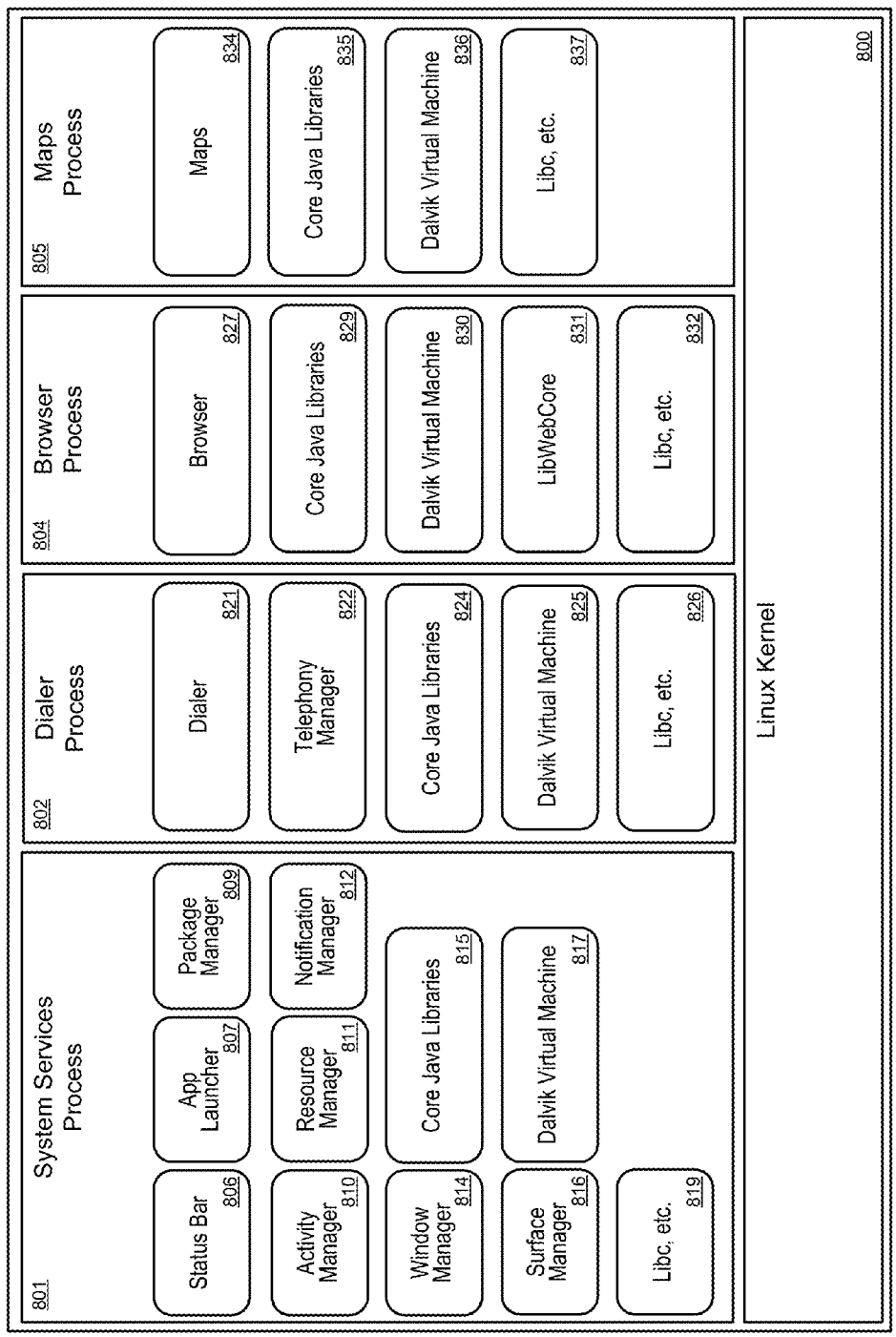
FIG. 8 is a block diagram illustrating exemplary processes implemented by the operating system kernel of FIG. 7.

FIG. 8 is a block diagram illustrating exemplary processes implemented by the operating system kernel 800. Generally, applications and system services run in separate processes, where the activity manager 746 runs each application in a separate process and manages the application life cycle. The applications run in their own processes, although many activities or services can also run in the same process. Processes are started and stopped as needed to run an application's components, and processes may be terminated to reclaim resources. Each application is assigned its own process, whose name is the application's package name, and individual parts of an application can be assigned another process name.

Some processes can be persistent. For example, processes associated with core system components such as the surface manager 816, the window manager 814, or the activity manager 810 can be continuously executed while the device 500 is powered. Additionally, some application-specific process can also be persistent. For example, processes associated with the dialer application 821, may also be persistent.

The processes implemented by the operating system kernel 800 may generally be categorized as system services processes 801, dialer processes 802, browser processes 804, and maps processes 805. The system services processes 801 include status bar processes 806 associated with the status bar 739; application launcher processes 807 associated with the application launcher 740; package manager processes 809 associated with the package manager 741; activity manager processes 810 associated with the activity manager 746; resource manager processes 811 associated with a resource manager 811 that provides access to graphics, localized strings, and XML layout descriptions; notification manger processes 812 associated with the notification manager 744; window manager processes 814 associated with the window manager 745; core JAVA libraries processes 815 associated with the core JAVA libraries 731; surface manager processes 816 associated with the surface manager 721; Dalvik virtual machine processes 817 associated with the Dalvik virtual machine 732, and LIBC processes 819 associated with the LIBC library 725.

The dialer processes 802 include dialer application processes 821 associated with the dialer application 749; telephony manager processes 822 associated with the telephony manager 742; core JAVA libraries processes 824 associated with the core JAVA libraries 731; Dalvik virtual machine processes 825 associated with the Dalvik Virtual machine 732; and LIBC processes 826 associated with the LIBC library 725. The browser processes 804 include browser application processes 827 associated with the browser application 751; core JAVA libraries processes 829 associated with the core JAVA libraries 731; Dalvik virtual machine processes 830 associated with the Dalvik virtual machine 732; LIBWEBCORE processes 831 associated with the LIBWEBCORE library 726; and LIBC processes 832 associated with the LIBC library 725.

The maps processes 805 include maps application processes 834, core JAVA libraries processes 835, Dalvik virtual machine processes 836, and LIBC processes 837. Notably, some processes, such as the Dalvik virtual machine processes, may exist within one or more of the systems services processes 801, the dialer processes 802, the browser processes 804, and the maps processes 805.

Figure 9:
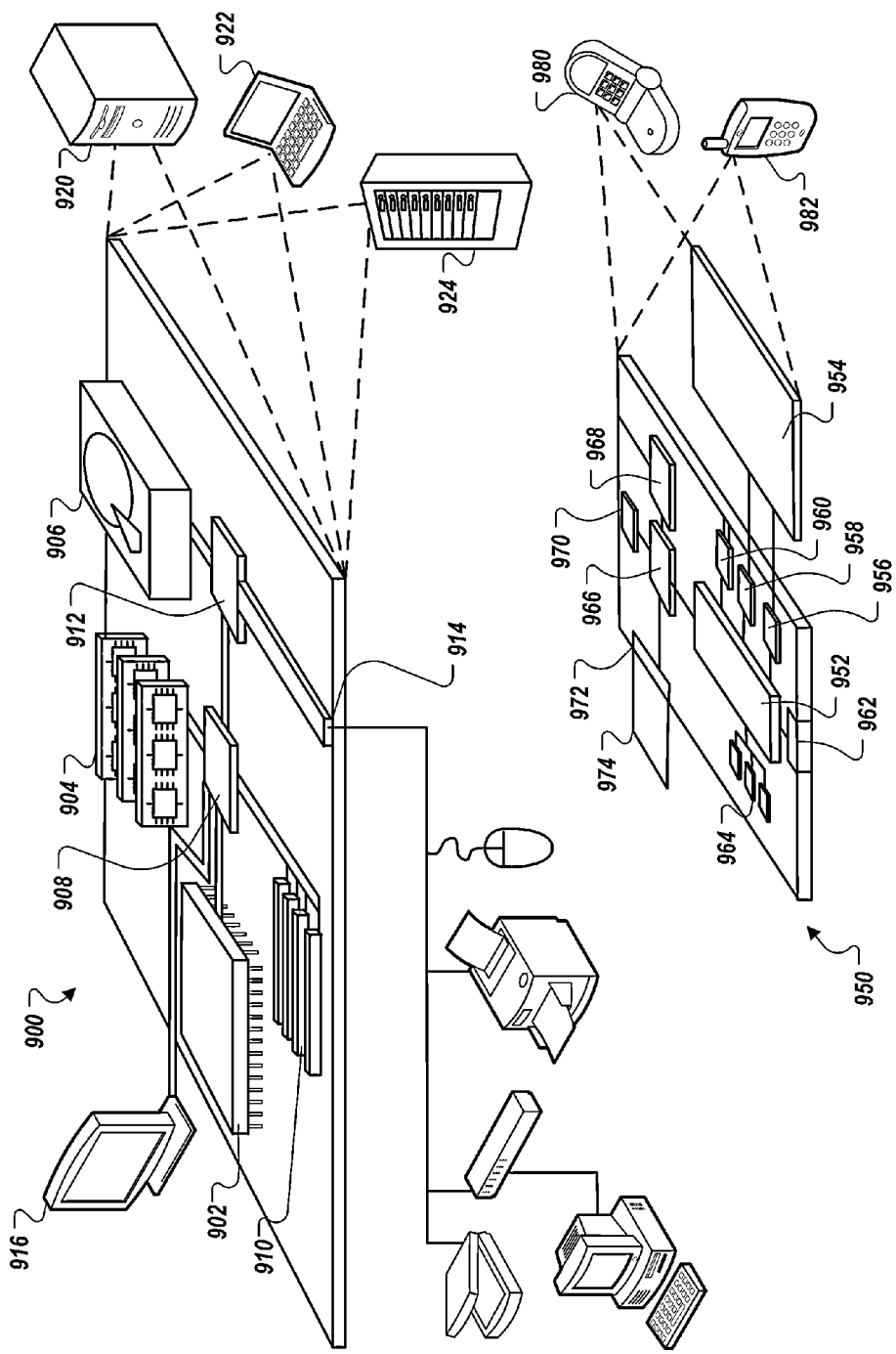
FIG. 9 shows an example of a computer device and a mobile computer device that can be used to implement the techniques described here.

FIG. 9 shows an example of a generic computer device 900 and a generic mobile computer device 950, which may be used with the techniques described here. Computing device 900 is intended to represent various forms of digital computers, such as laptops, desktops, workstations, personal digital assistants, servers, blade servers, mainframes, and other appropriate computers. Computing device 950 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, memory on processor 902, or a propagated signal.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provide as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, memory on processor 952, or a propagated signal that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smartphone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. For example, much of this document has been described with respect to messaging and mapping applications, but other forms of graphical applications may also be addressed, such as interactive program guides, web page navigation and zooming, and other such applications.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented user interface method, comprising:
   receiving a first input corresponding to a first location on a touchscreen graphical user interface;
   receiving, after receiving the first input, a second input corresponding to a second location on the touchscreen graphical user interface, wherein the first and second input comprise a press on the touchscreen graphical user interface and a release off the touchscreen graphical user interface within a predetermined period of time;
   determining a distance between the first location and the second location along a horizontal or vertical axis of the touchscreen graphical user interface;
   determining, based on a determination that the distance exceeds a threshold, that the first input and the second input comprise a zooming command;
   determining a type and a magnitude of a zooming action centered on a point that is substantially centered along a notional line between the first location and the second location, wherein:
      the type and the magnitude of the zooming action are determined based at least in part on (i) the first location, (ii) the second location, and (iii) an orientation of the first location relative to the second location, and
      determining the type of the zooming action comprises determining whether the zooming action is a zoom-in or a zoom-out action.

2. The method of claim 1, wherein the touchscreen graphical user interface displays a map of a geographical area.

3. The method of claim 1, further comprising determining a distance between the first location and the second location, and computing the magnitude of the zooming action based on the determined distance.

4. The method of claim 3, wherein a larger determined distance results in a greater magnitude of the zooming action.

5. The method of claim 1, wherein determining a type and a magnitude of a zooming action centered on a point that is substantially centered along a notional line between the first location and the second location comprises:
   determining that the type of the zooming action is the zoom-in action on the touchscreen graphical user interface based upon the first location being substantially higher on the vertical axis of the touchscreen graphical user interface than the second location; or
   determining that the type of the zooming action is the zoom-out action on the touchscreen graphical user interface based upon the first location being substantially lower on the vertical axis of the touchscreen graphical user interface than the second location.

6. The method of claim 1, wherein determining a type and a magnitude of a zooming action centered on a point that is substantially centered along a notional line between the first location and the second location comprises:
   determining that the type of the zooming action is the zoom-in action on the touchscreen graphical user interface based upon the first location being substantially to the right on the horizontal axis of the touchscreen graphical user interface of the second location; or
   determining that the type of the zooming action is the zoom-out action on the touchscreen graphical user interface based upon the first location being substantially to the left on the horizontal axis of the touchscreen graphical user interface of the second location.

7. The method of claim 1, further comprising, before receiving the first input and the second input, receiving an initiating user selection to enter zooming parameters, and displaying a zooming icon in response to the initiating user selection.

8. The method of claim 7, wherein the initiating user selection comprises a long press input on the graphically-displayed object.

9. A non-transitory computer-readable medium storing software comprising instructions executable by one or more computers which, upon such execution, cause the one or more computers to perform operations comprising:
   receiving a first input corresponding to a first location on a touchscreen graphical user interface;
   receiving, after receiving the first input, a second input corresponding to a second location on the touchscreen graphical user interface, wherein the first and second input comprise a press on the touchscreen graphical user interface and a release off the touchscreen graphical user interface within a predetermined period of time;
   determining a distance between the first location and the second location along a horizontal or vertical axis of the touchscreen graphical user interface;
   determining, based on a determination that the distance exceeds a threshold, that the first input and the second input comprise a zooming command;
   determining a type and a magnitude of a zooming action centered on a point that is substantially centered along a notional line between the first location and the second location, wherein:
      the type and the magnitude of the zooming action are determined based at least in part on (i) the first location, (ii) the second location, and (iii) an orientation of the first location relative to the second location, and
      determining the type of the zooming action comprises determining whether the zooming action is a zoom-in or a zoom-out action.

10. The medium of claim 9, wherein the touchscreen graphical user interface displays a map of a geographical area.

11. The medium of claim 9, wherein the operations further comprise determining a distance between the first location and the second location, and computing the magnitude of the zooming action based on the determined distance.

12. The medium of claim 11, wherein a larger determined distance results in a greater magnitude of the zooming action.

13. The medium of claim 9, wherein determining a type and a magnitude of a zooming action centered on a point that is substantially centered along a notional line between the first location and the second location comprises:
   determining that the type of the zooming action is the zoom-in action on the touchscreen graphical user interface based upon the first location being substantially higher on the vertical axis of the touchscreen graphical user interface than the second location; or
   determining that the type of the zooming action is the zoom-out action on the touchscreen graphical user interface based upon the first location being substantially lower on the vertical axis of the touchscreen graphical user interface than the second location.

14. The medium of claim 9, wherein determining a type and a magnitude of a zooming action centered on a point that is substantially centered along a notional line between the first location and the second location comprises:
   determining that the type of the zooming action is the zoom-in action on the touchscreen graphical user interface based upon the first location being substantially to the right on the horizontal axis of the touchscreen graphical user interface of the second location; or
   determining that the type of the zooming action is the zoom-out action on the touchscreen graphical user interface based upon the first location being substantially to the left on the horizontal axis of the touchscreen graphical user interface of the second location.

15. The medium of claim 9, wherein the operations further comprise, before receiving the first input and the second input, receiving an initiating user selection to enter zooming parameters, and displaying a zooming icon in response to the initiating user selection.

16. The medium of claim 15, wherein the initiating user selection comprises a long press input on the graphically-displayed object.

17. A system comprising:
   one or more computers and one or more storage devices storing instructions that are operable, upon execution by the one or more computers, to cause the one or more computers to perform operations comprising:
      receiving a first input corresponding to a first location on a touchscreen graphical user interface;
      receiving, after receiving the first input, a second input corresponding to a second location on the touchscreen graphical user interface, wherein the first and second input comprise a press on the touchscreen graphical user interface and a release off the touchscreen graphical user interface within a predetermined period of time;
      determining a distance between the first location and the second location along a horizontal or vertical axis of the touchscreen graphical user interface;
      determining, based on a determination that the distance exceeds a threshold, that the first input and the second input comprise a zooming command;
      determining a type and a magnitude of a zooming action centered on a point that is substantially centered along a notional line between the first location and the second location, wherein:
         the type and the magnitude of the zooming action are determined based at least in part on (i) the first location, (ii) the second location, and (iii) an orientation of the first location relative to the second location, and
         determining the type of the zooming action comprises determining whether the zooming action is a zoom-in or a zoom-out action.

18. The system of claim 17, wherein the operations further comprise determining a distance between the first location and the second location, and computing the magnitude of the zooming action based on the determined distance.

19. The system of claim 18, wherein a larger determined distance results in a greater magnitude of the zooming action.

20. The system of claim 17, wherein determining a type and a magnitude of a zooming action centered on a point that is substantially centered along a notional line between the first location and the second location comprises:
   determining that the type of the zooming action is the zoom-in action on the touchscreen graphical user interface based upon the first location being substantially higher on the vertical axis of the touchscreen graphical user interface than the second location; or
   determining that the type of the zooming action is the zoom-out action on the touchscreen graphical user interface based upon the first location being substantially lower on the vertical axis of the touchscreen graphical user interface than the second location.

21. The system of claim 17, wherein determining a type and a magnitude of a zooming action centered on a point that is substantially centered along a notional line between the first location and the second location comprises:

determining that the type of the zooming action is the zoom-in action on the touchscreen graphical user interface based upon the first location being substantially to the right on the horizontal axis of the touchscreen graphical user interface of the second location; or determining that the type of the zooming action is the zoom-out action on the touchscreen graphical user interface based upon the first location being substantially to the left on the horizontal axis of the touchscreen graphical user interface of the second location.

22. The system of claim 17, wherein the operations further comprise, before receiving the first input and the second input, receiving an initiating user selection to enter zooming parameters, and displaying a zooming icon in response to the initiating user selection.

23. The system of claim 22, wherein the initiating user selection comprises a long press input on the graphically-displayed object.

24. The system of claim 17, wherein the touchscreen graphical user interface displays a map of a geographical area.

* * * * *

UNITED STATES PATENT AND TRADEMARK OFFICE
CERTIFICATE OF CORRECTION

| | | |
|---|---|---|
| PATENT NO. | : 8,468,469 B1 | Page 1 of 1 |
| APPLICATION NO. | : 12/423084 | |
| DATED | : June 18, 2013 | |
| INVENTOR(S) | : Mendis et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 610 days.

Signed and Sealed this
Sixth Day of January, 2015

Michelle K. Lee
*Deputy Director of the United States Patent and Trademark Office*